(12) United States Patent
Bittles et al.

(10) Patent No.: US 8,200,765 B2
(45) Date of Patent: Jun. 12, 2012

(54) PRESERVING MESSAGE ORDER USING A MESSAGE ORDERING MANAGER

(75) Inventors: William Bittles, Winchester (GB); Simon R. Gormley, Peebles (GB); Christopher Matthewson, Eastleigh (GB); Paul Titheridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/352,284

(22) Filed: Jan. 12, 2009

(65) Prior Publication Data
US 2010/0179994 A1 Jul. 15, 2010

(51) Int. Cl.
G06F 15/16 (2006.01)

(52) U.S. Cl. ...................................................... 709/206

(58) Field of Classification Search .................. 709/248, 709/215, 236, 232, 228, 224, 208, 206, 203; 370/516, 509, 503, 480, 474, 468, 466, 465, 370/447
See application file for complete search history.

(56) References Cited

U.S. PATENT DOCUMENTS

| 7,240,097 | B2 * | 7/2007 | Holdsworth et al. | 709/207 |
| 2003/0115119 | A1 * | 6/2003 | Schleicher | 705/35 |
| 2003/0158883 | A1 * | 8/2003 | Drudis et al. | 709/102 |
| 2004/0015408 | A1 * | 1/2004 | Rauen et al. | 705/26 |
| 2006/0039546 | A1 | 2/2006 | Davidson et al. | |
| 2006/0080669 | A1 | 4/2006 | Deister et al. | |
| 2007/0118601 | A1 * | 5/2007 | Pacheco | 709/206 |
| 2007/0124398 | A1 | 5/2007 | Parkinson et al. | |

OTHER PUBLICATIONS

Hapner et al., "Java Message Service", Sun Microsystems.

* cited by examiner

*Primary Examiner* — Asad M Nawaz
*Assistant Examiner* — Charles Murphy
(74) *Attorney, Agent, or Firm* — Scully, Scott, Murphy & Presser, P.C.; Jeanine S. Ray-Yarletts, Esq.

(57) ABSTRACT

A method and system for preserving a message ordering while processing message are discussed. A message ordering manager records an order in which electronic messages arrive at an input queue. An application server processes the electronic messages out-of-order or in parallel. The message ordering manager commits the processed electronic messages in the order in which electronic messages arrive at an input queue. If a processed message cannot be committed because older message(s) are not completely processed, then application server determines whether processing older message(s) is critical or not. If the processing the older message(s) is critical, the application server rolls back the processed message and the older message(s). Otherwise, the message ordering manager commits the processed message before the older electronic messages are committed.

20 Claims, 3 Drawing Sheets

PRESERVING MESSAGE ORDER USING A MESSAGE ORDERING MANAGER

BACKGROUND OF THE INVENTION

1. Fields of the Invention

The present invention relates to processing electronic messages. More particularly, the present invention relates to processing electronic messages out-of-order or in parallel and committing the processed electronic messages in order or out-of-order.

2. Description of the Prior Art

An electronic message refers to any type of data structure exchanged between two parties (e.g., two hardware, two software, hardware and software, etc.) via an electronic communication. The electronic message includes, but is not limited to, an e-mail, an instant message, an audio message, a text message and a facsimile message.

One of key elements of Java Message Service (JMS) is message-driven beans (MDBs). The JMS is a messaging standard that allows applications based on Java® software technology to create, send, receive and read electronic messages. The JMS enables distributed, loosely coupled, reliable and asynchronous communication between an electronic message publisher (i.e., a computing device generating an electronic message) and an electronic message subscriber (i.e., a computing device receiving the electronic message). MDBs are a component that allows Java® applications to process electronic messages asynchronously. MDBs act as a JMS message listener, which is similar to an event listener/detector except it receives electronic messages instead of events. MDBs monitor a queue receiving electronic messages. When an electronic message arrives at the queue, an instance of the MDB is invoked asynchronously to process the electronic message. The MDB instance refers to one or more threads executing the MDB.

Within servers including Java® applications, it is possible to have multiple instances of an MDB processing electronic messages concurrently. The electronic messages are removed from the queue and delivered to the MDB instance(s) in an order in which they arrive at the queue to process the electronic messages in the order.

Thus, in a traditional solution, to preserve a message ordering (i.e., processing electronic messages in the order that they arrive at the queue), the traditional solution implements a sequential logic in the MDB. The sequential logic refers to a counting attribute, which is implemented in an electronic message header. For example, if an electronic message needs to be processed in a sequence, then a message publisher add a sequence number into the electronic message header in the electronic message. The sequence number starts at 0 and is incremented by 1 for each message added by the electronic message publisher. When the electronic messages are delivered to an MDB, the MDB checks the sequence number of a current message in the header, and compares the sequence number of the current message to the sequence number of the last message that was successfully processed. If the sequence number of the current message is 1 greater than the sequence number of the last message processed, then the MDB attempt to process the current message. Otherwise, the current message is rolled back onto the queue that the electronic message came from. Thus, the MDB needs to maintain a record of the last message that was successfully processed. When a new message is delivered to an MDB, the MDB needs to check whether this message has a right sequence number, which equals to the sequence number of a last message +1.

However, the traditional solution is not efficient due to requiring adding a sequence number in an electronic message header and comparing sequence numbers whenever receiving a new message. Furthermore, the traditional solution requires application developers to implement the sequential logic in the MDB, rather than focusing on an actual processing of electronic messages.

Thus, to improve efficiency when processing electronic messages and to remove a necessity of implementing the sequential logic in the MDB, it is desired to provide a method and a system for processing electronic messages out-of-order or in parallel and committing the processed electronic messages in order or out-of-order.

SUMMARY OF THE INVENTION

The present invention describes a method and a system for processing electronic messages out-of-order or in parallel and committing the processed electronic messages in order or out-of-order.

In one embodiment, there is provided a method for preserving a message order while processing electronic messages, the method comprising:

receiving electronic messages at an input queue;

maintaining, at a message ordering manager, a list of the received electronic messages, the list including an order sequence in which the electronic messages arrive at the input queue;

providing the electronic messages from the input queue to an application server adapted for processing the electronic messages;

processing, at the application server, the electronic messages not in the order sequence; and committing, at the message ordering manager, the processed electronic messages according to the order sequence in the list.

In one embodiment, there is provided a method for handling electronic messages that cannot be processed, the method comprising:

receiving a first electronic message and one or more subsequent electronic messages at an input queue;

providing the first electronic message and the one or more subsequent electronic messages from the input queue to an application server adapted for processing the first electronic message and the one or more subsequent electronic messages;

attempting processing of the first message and the one or more subsequent electronic messages out-of-order;

checking whether the first message has been processed;

waiting for a predetermined period of time for the first message to be processed, if the first message is not processed yet;

rolling back the one or more subsequent electronic messages, if the first message is not processed until at the end of the period; and cancelling all changes made while processing the one or more subsequent electronic messages.

In one embodiment, there is provided a system for handling electronic messages that cannot be processed, the system comprising:

an input queue for receiving a first electronic message and one or more subsequent electronic messages at an input queue;

means for providing the first electronic message and the one or more subsequent electronic messages from the input queue to an application server adapted for processing the first electronic message and the one or more subsequent electronic messages, the application server attempting processing of the first message and the one or more subsequent electronic messages out-of-order;

means for checking whether the first message has been processed;

means for waiting for a pre-determined period of time for the first message to be processed, if the first message is not processed yet;

means for rolling back the one or more subsequent electronic messages, if the first message is not processed until at the end of the period; and means for cancelling all changes made while processing the one or more subsequent electronic messages.

In one embodiment, there is provided a method for processing electronic messages, the method comprising:

receiving a first electronic message and one or more subsequent electronic messages at an input queue;

providing the first electronic message and the one or more subsequent electronic messages from the input queue to an application server adapted for processing the first electronic message and the one or more subsequent electronic messages;

attempting processing of the first electronic message and the one or more subsequent electronic messages out-of-order;

checking whether the first electronic message has been processed;

waiting for a pre-determined period of time for the first electronic message to be processed, if the first message is not processed;

determining whether the processing of the first electronic message is critical; and committing the one or more subsequent electronic messages, if the processing of the first electronic message is not critical.

In one embodiment, there is provided a system for processing electronic messages, the method comprising:

an input queue for receiving a first electronic message and one or more subsequent electronic messages at an input queue;

means for providing the first electronic message and the one or more subsequent electronic messages from the input queue to an application server adapted for processing the first electronic message and the one or more subsequent electronic messages, the application server attempting processing of the first electronic message and the one or more subsequent electronic messages out-of-order;

means for checking whether the first electronic message has been processed;

means for waiting for a pre-determined period of time for the first electronic message to be processed, if the first message is not processed;

means for determining whether the processing of the first electronic message is critical; and means for committing the one or more subsequent electronic messages, if the processing of the first electronic message is not critical.

In a further embodiment, the first message and the one or more subsequent electronic messages are tried to be processed in parallel.

In a further embodiment, the criticality of the processing of the first message is based on a dependency between the first message and the one or more subsequent electronic messages.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

"Processing an electronic message" refers to doing work related to the electronic message itself, e.g., handling of the electronic message. Once this work has been completed successfully, the processed message is "committed". It is noted that electronic messages are typically "committed" in the order which messages arrived at an input queue (e.g., an input queue 140 in FIG. 1). The being committed refers to finalizing the work and any changes that may have occurred, so that the changes are affirmed and cannot be canceled. For example, one electronic message delivered to an MDB might contain an order for a book. The "processing" of this message would involve checking stock levels in a database, decrementing a stock counter, printing out an address label and taking payment from a buyer's bank account. If anything goes wrong during any of these steps, all the works (i.e., all the processing) can be "rolled back" to a previous state (i.e., a state before starting to process the electronic message) and the electronic message is returned to its original location such as in input queue 140 in FIG. 1. "Rolling back an electronic message" refers to cancelling all the works that has been made while processing the electronic message and returning to a previous state, which is a state before starting to execute the electronic message. If all the steps e.g., from checking stock levels to taking payment from a buyer's account, complete successfully, then the processed message is "committed" and all the changes made while processing the electronic message is confirmed.

An application server refers to a server that hosts an API (Application Programming Interface) to execute a logic or process used by other applications. Examples of application servers include, but are not limited to: WebSphere® Application Server from IBM®, WebLogic® Server from Oracle®, Apache Geronimo from Apache Software Foundation, Sun Java® System Application Server from SUN®, etc.

To improve efficiency of processing electronic messages and avoid the sequential logic implementation, one embodiment of the invention implements an electronic message ordering manager (e.g., message ordering manager 130 in FIG. 1) that is responsible for committing the electronic messages after the electronic messages have been processed by the MDB instance(s). The message ordering manager ensures that message ordering is preserved (i.e., electronic messages are committed in the order which the electronic messages arrived at an input queue), and does not require a logic (e.g., the sequential logic) to retain the message order to be implemented in the MDB.

To preserve the message order, the message ordering manager records the order in which electronic messages arrive at an input queue (e.g., an input queue 140) being monitored by the MDB instances, and ensure that, after the electronic messages have been processed by the MDB instances, the electronic messages are be committed in the same order, i.e., the order that the electronic messages arrive at the input queue. In one embodiment, the message ordering manager detects electronic messages arriving at the input queue (i.e., a queue receiving electronic messages from message publishers) before the electronic messages are processed by MDB instance(s).

Following is an exemplary embodiment of the invention. Suppose that there is an input queue storing three electronic messages—a first message, a second message and a third message—and there are two MDB instances processing the electronic messages. When the electronic messages arrived at the queue, the message ordering manager recorded an order in which they arrived. In this example, assume that the first message arrived at first, the second message arrived at second, and the third message arrived last. A first MDB Instance—MDB1—selects the first message and starts processing it. A second MDB instance, MDB2, selects the second message and starts processing it. Assume that the MDB2 completes processing the second message before the MDB1 completes processing the first message. After the MDB2 finishes processing the second message, the MDB2 reports the completion of processing the second message to the message ordering manager. Because the MDB1 is still processing the first message, the message ordering manager delays committing the processed second message. Because MDB2 can resume processing other electronic messages in the queue, the MDB2 selects the third message to process it. After the MDB1 completes processing the first message, the MDB1 notifies the message ordering manager of the completion of processing the first message, and resumes processing other electronic messages in the queue. Then, the message ordering manager commits the processed first message, followed by processed second message. When MDB2 completes processing the third message, it reports the completion of processing the third message to the message ordering manager. Because all of the electronic messages before the third message have already been processed and committed, the message ordering manager commits the processed third message immediately.

Figure 1:
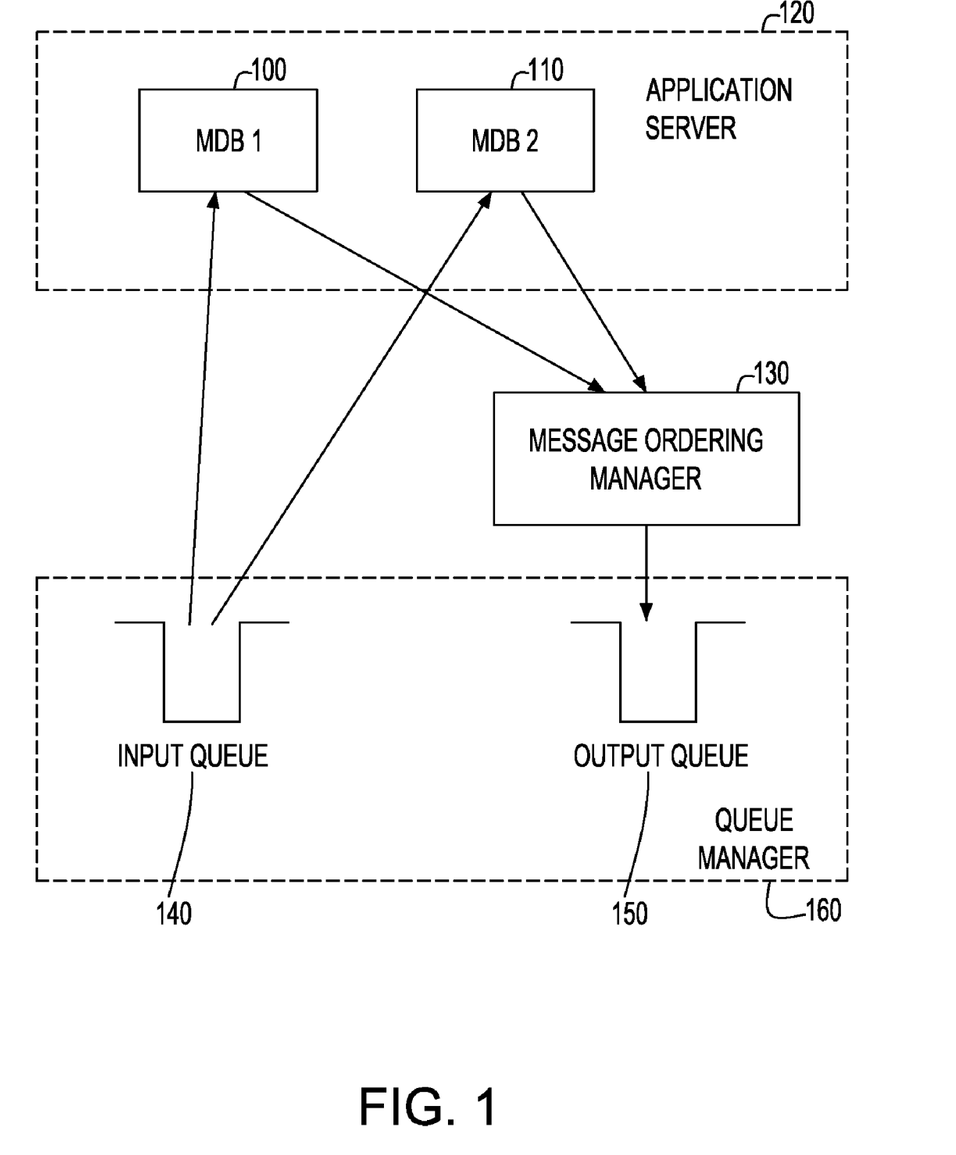
FIG. 1 illustrates a system diagram in one embodiment of the invention.

FIG. 1 illustrates a system diagram in one embodiment of the invention. An input queue 140 receives electronic messages from message publishers (not shown). The message ordering manager 130 records an order in which the electronic messages arrive at the input queue 140. The message ordering manager 130 may maintain a sequential list of electronic messages. The list includes an order sequence in which the message arrives at the input queue. In one embodiment, each message includes a unique identifier, stored in an electronic message header. The unique identifier may be based on a time when the message is arrived at the input queue 140. Thus, if electronic messages A, B, C arrives at the input queue 140 in this order (i.e., A-B-C), the message ordering manager 130 stores following information in the sequential list: "Message Order: A, B, C".

Then, a queue manager 160 provides the electronic messages from the input queue to an application server 120, where the electronic messages are processed. The queue manager 160 is a component that provides queuing services to applications. The queue manger 160 may provide an API so that applications can place electronic messages on and obtains electronic messages from queues. The queue manager 160 may further provide additional functions such as creating new queue(s), altering properties of existing queue(s), etc. In one embodiment, the application server 120 selects directly the electronic messages in the input queue 140 to process without an involvement of the queue manager 160. Upon selecting an electronic message to process or receiving an electronic message to be processed, the application server 120 invokes an MDB instance, e.g., MDB 1 or MDB 2. Thus, the application server 120 may include a plurality of MDB instances to process electronic messages concurrently or in parallel. An MDB instance may process one or more electronic messages concurrently or sequentially. In one embodiment, the application server 120 including the plurality of MDB instances processes the electronic messages out-of-order, i.e., processes electronic messages without being constrained to an order in which the electronic messages arrives at the input queue, e.g., processes electronic messages not in the order sequence in the sequential list. In out-of-order processing, the application server 120 may complete processing of an electronic message, before completions of processing of older message(s). For example, electronic messages A, B, C arrive arrives at the input queue 120 in this order, i.e., A-B-C, the application server 120 may complete processing of the electronic message C, before starting to process electronic messages A and B.

When an MDB instance completes processing an electronic message, the MDB instance notifies the message ordering manager 130 that the MDB instance completes processing the electronic message. Then, the MDB instance may check whether older electronic messages (i.e., electronic messages arrived at the input queue 140 before the electronic message whose processing is just completed) are already processed or committed. If all the older electronic messages are committed already, then the message ordering manager 130 commits the electronic message, of which the application sever 120 notified a completion of processing. If the older electronic messages are already processed but has not been committed, then the message ordering manger 130 commits the processed older electronic messages in an order in which the older electronic messages arrived at the input queue 140. After committing all the older electronic messages in the order, the message ordering manger 130 commits the electronic message, of which the application sever 120 notified a completion of processing. Thus, the message ordering manager 130 commits processed electronic messages according to an order in which the processed electronic messages arrived at the input queue 140.

After the message ordering manager 130 commits an electronic message, the committed message may be placed in an output queue 150, from which committed electronic messages are delivered to message subscribers by the queue manager 160. Though FIG. 1 illustrates one input queue 140 and one output 150, there may be a plurality of input queues and output queues. In one embodiment, there may be a message ordering manager per an input queue, as shown in FIG. 1. In another embodiment, there may be only one message ordering manager monitoring all input queues. When there is only one message ordering manager, the message ordering manager may globally monitor all the input queues. For example, if two sequential electronic messages (a first message and a second message) arrives at two different input queues—a first message arrives at a first input queue before a second message arrives at a second input queue, the message ordering manager records a message order in the sequential list such as "Message order: the first message, the second message". Then, the message ordering manager ensures that the first message is committed before the second message, e.g., by delaying committing the second message, if the second message is completely processed before the first message is processed.

In one embodiment, the message ordering manager is able to handle electronic messages that cannot be processed. For example, a first message arrives at an input queue 140. Subsequently, a second message arrives at an input queue 140. However, the application server 120 completes processing the second message before a completion of processing the first message. Then, the first message is rolled back, e.g., due to its processing time assigned to the first message is expired. Thus, committing the second message may be delayed, as the second message can be committed after the first message has been processed. In this situation (i.e., a situation in that committing a processed message is delayed due to one or more older electronic messages has not been processed), the message ordering manager 130 is configured to do one of followings:

"Wait and Roll Back": Wait for a pre-determined period of time for the first message to be committed before deciding to roll back the second message and all subsequent electronic messages ("Wait and Roll Back" is described in detail herein below.)

"Wait and Commit": Wait for a pre-determined period of time for the first message to be committed before deciding to commit the second message and all subsequent electronic messages anyway ("Wait and Commit" is described in detail herein below.)

The pre-determined period of time can be configured by the message ordering manager 130. Whether to choose "Wait and Roll Back" or "Wait and Commit" can be configured by the application server 120.

Following describes the "Wait and Roll Back" scheme in detail. The input queue 140 receives a first message and one or more subsequent electronic messages from message publisher(s). The message ordering manager 130 may record an order in which the first message and the one or more subsequent electronic messages arrive at the input queue 140. The queue manager 160 provides the first message and the one or more subsequent electronic messages from the input queue to an application server 120, where the first electronic messages and the one or more subsequent electronic messages are tried to be processed. The application server 120 may try to process first electronic messages and the one or more subsequent electronic messages out-of-order, in parallel, concurrently, or sequentially. Whenever the application server 120 completes processing an electronic message, the application server 120 notifies a completion of processing the electronic message to the message ordering manager 130. If the application server completes processing the first message and the subsequent electronic messages, the message ordering manager commits the first message and the subsequent electronic messages in the order in which the first message and the one or more subsequent electronic messages arrive at the input queue 140. However, if application server 120 completes processing the one or more subsequent electronic messages before the application server 120 completes processing the first message, the message ordering manager 130 monitors the application server 120 to check whether the first message is being processed or is going to be processed. Then, the message ordering manager 130 waits a pre-determined period of time, e.g., 10 seconds, for the first message to be completely processed. During the pre-determined period of time, the message ordering manger 130 requests the application server 120 to complete or start processing of the first message. If the message ordering manager 130 does not receive a notification of a completion of processing the first message at the end of the period, the message ordering manager 130 asks the application server 130 to roll back the one or more subsequent electronic messages. In one embodiment, when the application server 130 rolls back the one or more subsequent electronic messages, the application server 130 may also roll back the first message if the first message is being processed. In another embodiment, when the application server 130 rolls back the subsequent electronic messages, the application server 130 may not roll back the first message if the first message is being processed. Then, the application server 120 cancels all changes made while processing the one or more subsequent electronic messages. If the application server 120 also rolled back the first message, the application server 120 also cancel changes made while processing the first message.

Following describes "Wait and Commit" scheme in detail. The input queue 140 receives a first message and one or more subsequent electronic messages from message publisher(s). The message ordering manager 130 may record an order in which the first message and the one ore subsequent electronic messages arrive at the input queue 140. The queue manager 160 provides the first message and the one or more subsequent electronic messages from the input queue to an application server 120, where the first electronic messages and the one or more subsequent electronic messages are tried to be processed. The application server 120 may try to process first electronic messages and the one or more subsequent electronic messages out-of-order, in parallel, concurrently, or sequentially. Whenever the application server 120 completes processing an electronic message, the application server 120 notifies a completion of processing the electronic message to the message ordering manager 130. If the application server completes processing the first message and the subsequent electronic messages, the message ordering manager commits the first message and the subsequent electronic messages in the order in which the first message and the one or more subsequent electronic messages arrive at the input queue 140. However, if the application server 120 completes processing the one or more subsequent electronic messages before the application server 120 completes processing the first message, the message ordering manager 130 monitors the application server 120 to check whether the first message is being processed or is going to be processed. Then, the message ordering manager 130 waits a predetermined period of time, e.g., 10 seconds, for the first message to be completely processed. During the pre-determined period of time, the message ordering manger 130 requests the application server 120 to complete or start processing the first message. If the message ordering manager 130 does not receive a notification of a completion of processing the first message at the end of the period, the message ordering manager 140 requests the application server 120 to determine a criticality of processing the first message. In one embodiment, the criticality of processing the first message may be based on a dependency between the first message and the one or more subsequent message. For example, if all changes made while processing the one or more subsequent electronic messages relies on processing the first message, the processing the first message is critical. However, if all the changes made while processing the one or more subsequent electronic messages are not affected by processing the first electronic message, then processing the first message is not critical. Whether processing the first message affects all the changes made by the one or more subsequent electronic messages or not may be determined by parsing and analyzing the first message without executing any task in the first message. If the application server 120 determines that processing the first message is not critical, i.e., changes made by processing the one or more subsequent electronic messages are not affected by processing the first message, then the message ordering manager commits the processed one or more subsequent electronic messages before a completion of processing the first message. Thus, the message ordering manager 130 enables committing processed electronic messages out-of-order, i.e., commits the one or more subsequent message before committing the first message, to expedite message processing. However, if the application server 120 determines that processing the first message is critical, the message ordering manager 130 asks the application server 130 to roll back the one or more subsequent electronic messages. In one embodiment, when the application server 130 rolls back the subsequent electronic messages, the application server 130 may also roll back the first message if the first message is being processed. In another embodiment, when the application server 130 rolls back the subsequent electronic messages, the application server 130 may not roll back the first message if the first message is being processed. Then, the application server 120 cancels all the changes made while processing the one or more subsequent electronic messages. If the application server 120 also rolled back the first message, the application server 120 also cancel changes made while processing the first message.

In one embodiment, while the message ordering manager 130 waits the pre-determined period of time before deciding whether committing processed subsequent electronic messages or rolling back the processed subsequent electronic messages, the application server 120 allows an MDB instance to retry processing the first message, if an MDB instance failed to process the first message before. It is possible that an MDB instance cannot process an electronic message because of a timing issue, so the application server 120 do not immediately roll back or commit the processed subsequent electronic messages, when the first message is rolled back. Instead, the message ordering manager 130 waits a pre-determined period of time during which processing the first message can be retried by the application server 120. An example of the timing issue may arise if a process or a thread locked a database table when an MDB instance processing the first message wants to update the database table.

Figure 2:
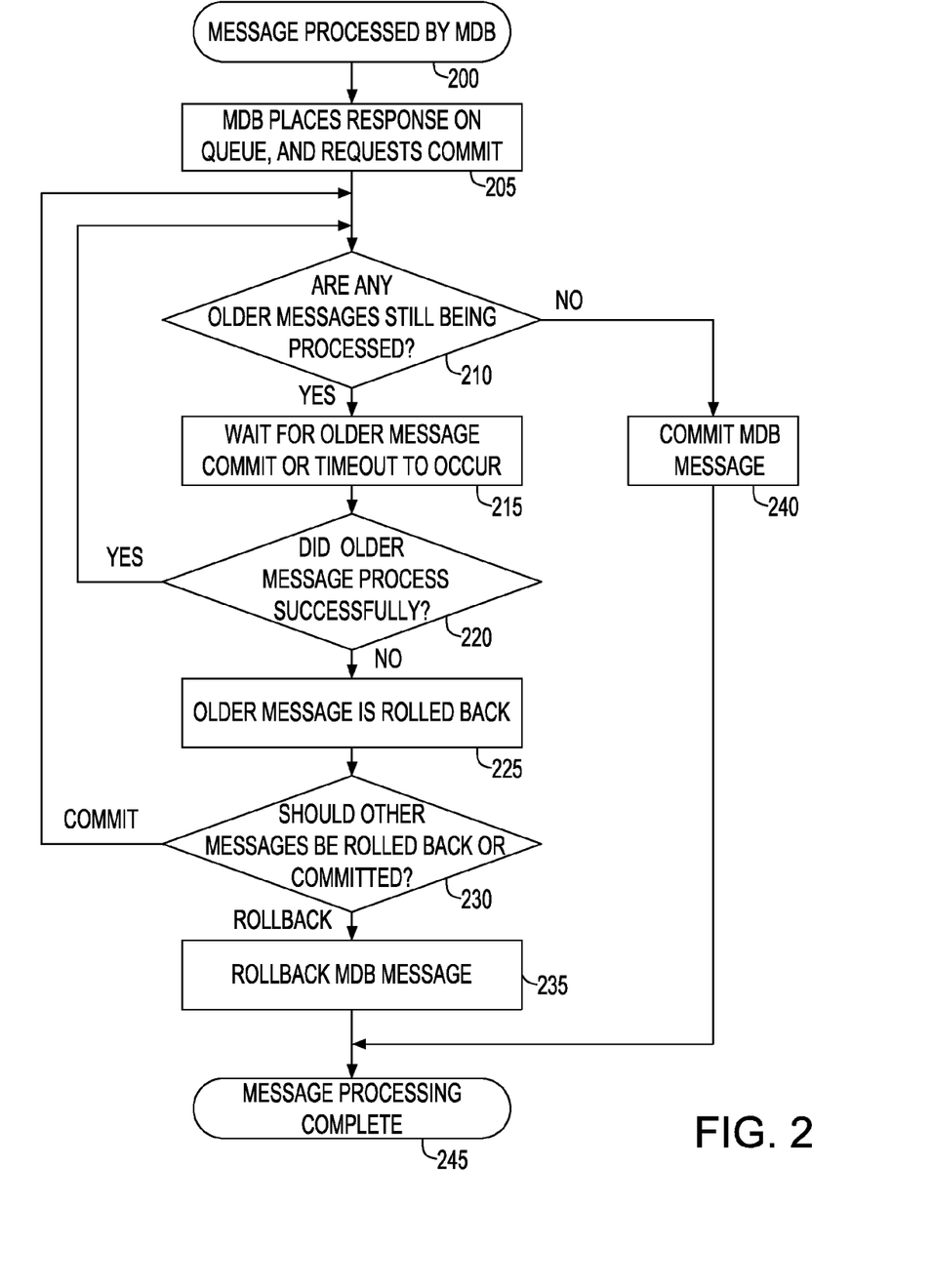
FIG. 2 illustrates method steps that one embodiment of the invention executes.

FIG. 2 illustrates method steps that one embodiment of the invention may executes. At step 200, an MDB instance completes processing an electronic message. At step 205, the MDB instance notifies the input queue 140 and the message ordering manager 130 that the MDB instance completed processing the electronic message. The MDB instance may further request the message ordering manager 130 to commit the processed message. At step 210, upon receiving a commitment request of the processed message, the message ordering manager 130 checks whether older electronic messages are still being processed. If older electronic messages are already processed and committed, at step 240, the message ordering manager 130 commits the processed message. Otherwise, at step 215, the message ordering manager waits a predetermined period of time for the older electronic messages are completely processed or a timeout occurs (i.e., an assigned execution time for processing older message is expired). After waiting the period of time, at step 220, the message ordering manger 130 checks whether the older electronic messages are completely processed. If the older electronic messages are completed processed, at step 240, the message ordering manager commits the older electronic messages first and then commits the processed message. Otherwise, the message ordering manager 130 requests the application server 120 to roll back the older electronic messages. Then, application server 120 cancels all changes made while processing the older electronic messages.

At step 230, the message ordering manager 230 determines whether rolling back the processed message or committing the processed message based on whether the message ordering manager 230 operates according to "Wait and Roll Back" scheme or "Wait and Commit" scheme. If the message ordering manager 230 operates according to "Wait and Roll Back" scheme, at step 235, the message ordering manager 230 requests the application server 120 to roll back the processed message. Then, at step 245, the application server 120 rolls back the processed message and cancels all changes made by the processed message.

If the message ordering manager 230 operates according to "Wait and Commit" scheme, at step 230, the message ordering manager 130 requests the application server 120 to determine a criticality of processing older electronic messages, e.g., whether changes made by the processed message can be affected processing older electronic messages. If the application server 120 determines that processing older message is critical, at step 235, then the application server 120 rolls back the processed message. Then, at step 245, the application server 120 cancels all the changes made by the processed message.

However, if the application server 120 determines that processing the older electronic messages is not critical, at step 240, the message ordering manager 130 commits the processed message. At step 245, the application server 120 confirms all the changes made by the processed message.

Figure 3:
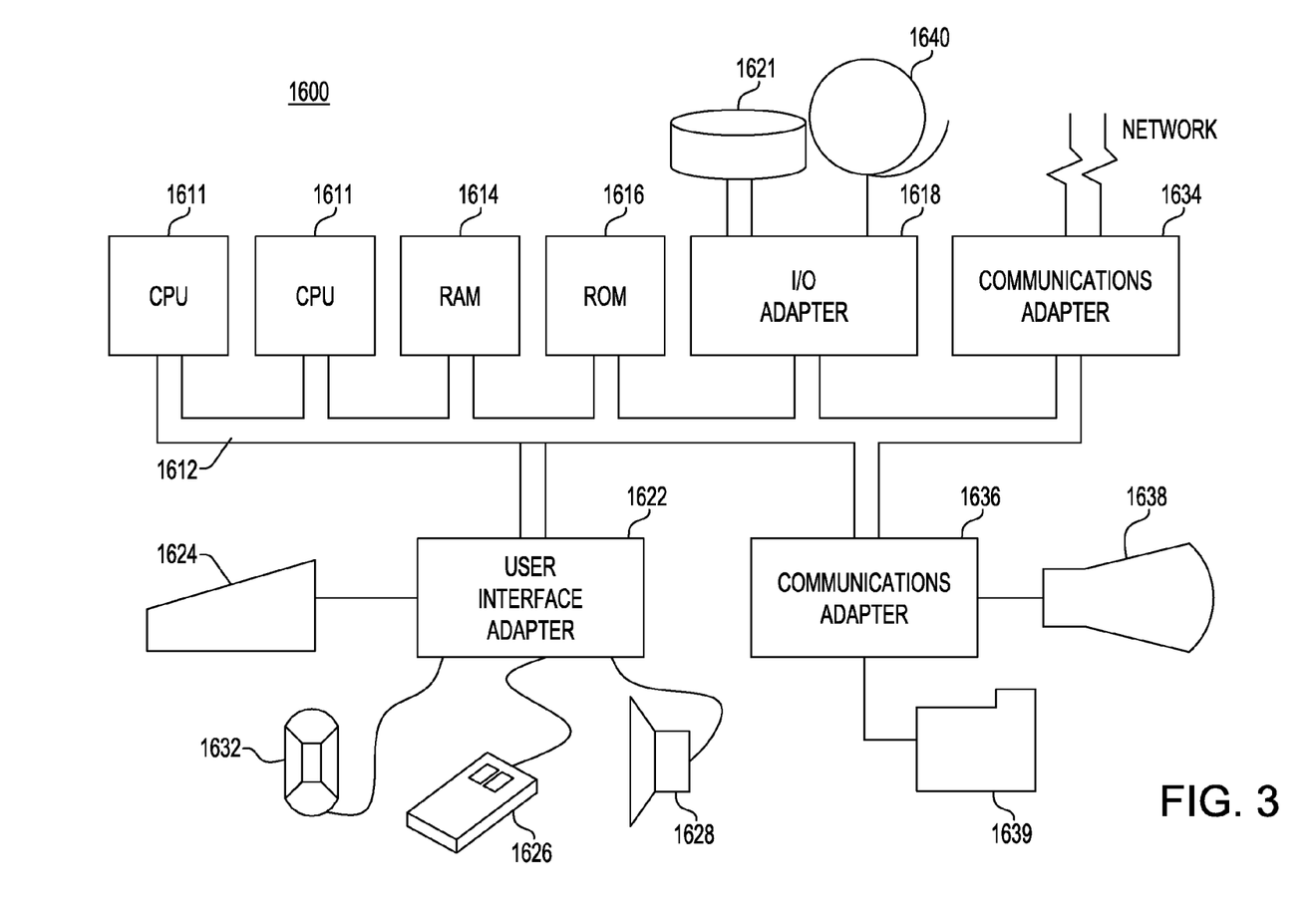
FIG. 3 illustrates hardware configuration Implementing one embodiment of the invention.

FIG. 3 illustrates a hardware configuration of a computing system 1600, e.g., the application server 120 and/or the message ordering manager 130, executing the method steps in FIG. 1. The hardware configuration preferably has at least one processor or central processing unit (CPU) 1611.

The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™ 2, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for preserving a message order while processing electronic messages, the method comprising:
   receiving electronic messages in an order sequence at an input queue;
   maintaining, at a message ordering manager, a list of the received electronic messages, the list including the order sequence in which the electronic messages arrive at the input queue;
   providing the electronic messages from the input queue to an application server adapted for processing the electronic messages;
   processing, at the application server, the electronic messages not in the order sequence; and
   committing, at the message ordering manager, the processed electronic messages according to the order sequence in the list,
   wherein the message ordering manager and the application server do not perform a sequential logic operation that indicates, within each electronic message, a position of said each electronic message in the order sequence.

2. The method according to claim 1, further comprising: processing the electronic messages in parallel.

3. A method for handling electronic messages that cannot be processed, the method comprising:
   receiving a first electronic message and one or more subsequent electronic messages in an order sequence at an input queue;
   maintaining, at a message ordering manager, a list of the received electronic messages, the list including the order sequence in which the first electronic message and the one or more subsequent electronic messages arrive at the input queue;
   providing the first electronic message and the one or more subsequent electronic messages from the input queue to an application server adapted for processing the first electronic message and the one or more subsequent electronic messages;
   attempting processing of the first message and the one or more subsequent electronic messages out-of-order;
   checking whether the first message has been processed;
   waiting for a pre-determined period of time for the first message to be processed, if the first message is not processed yet;
   rolling back the one or more subsequent electronic messages, if the first message is not processed until at the end of the period; and
   cancelling all changes made while processing the one or more subsequent electronic messages,
   wherein the receiving, the maintaining, the providing, the attempting, the checking, the waiting, the rolling back and the cancelling do not perform a sequential logic operation that indicates, within the first electronic message, a position of the first electronic message in the order sequence, and that indicates, within each of the one or more subsequent electronic messages, a position of said each of the one or more subsequent electronic messages in the order sequence.

4. The method according to claim 3, wherein the first message is tried again to be processed during the period of time.

5. The method according to claim 3, wherein the first message and the one or more subsequent electronic messages are tried to be processed in parallel.

6. A method for processing electronic messages, the method comprising:
   receiving a first electronic message and one or more subsequent electronic messages in an order sequence at an input queue;
   maintaining, at a message ordering manager, a list of the received electronic messages, the list including the order sequence in which the first electronic message and the one or more subsequent electronic messages arrive at the input queue;
   providing the first electronic message and the one or more subsequent electronic messages from the input queue to an application server adapted for processing the first electronic message and the one or more subsequent electronic messages;
   attempting processing of the first electronic message and the one or more subsequent electronic messages out-of-order;
   checking whether the first electronic message has been processed;

waiting for a pre-determined period of time for the first electronic message to be processed, if the first message is not processed;

determining whether the processing of the first electronic message is critical; and committing the one or more subsequent electronic messages, if the processing of the first electronic message is not critical, wherein the receiving, the maintaining, the providing, the attempting, the checking, the waiting, the determining and the cancelling do not perform a sequential logic operation that indicates, within the first electronic message, a position of the first electronic message in the order sequence, and that indicates, within each of the one or more subsequent electronic messages, a position of said each of the one or more subsequent electronic messages in the order sequence.

7. The method according to claim 6, wherein the first message and the one or more subsequent electronic messages are tried to be processed in parallel.

8. The method according to claim 6, wherein the criticality of the processing first message is based on a dependency between the first message and the one or more subsequent electronic messages.

9. The method according to claim 6, further comprising:
rolling back the one or more subsequent electronic messages, if the processing first message is critical; and
cancelling all changes made while processing the one or more subsequent electronic messages.

10. The method according to claim 6, wherein the first message is tried again to be processed during the period of time.

11. A system for handling electronic messages that cannot be processed, the system comprising:
an input queue for receiving a first electronic message and one or more subsequent electronic messages in an order sequence at an input queue;
a message ordering manager maintaining a list of the received electronic messages, the list including the order sequence in which the first electronic message and the one or more subsequent electronic messages arrive at the input queue;
a queue manager for providing the first electronic message and the one or more subsequent electronic messages from the input queue to an application server adapted for processing the first electronic message and the one or more subsequent electronic messages, the application server attempting processing of the first message and the one or more subsequent electronic messages out-of-order;
the message ordering manager for checking whether the first message has been processed and waiting for a pre-determined period of time for the first message to be processed, if the first message is not processed yet;
the application server for rolling back the one or more subsequent electronic messages, if the first message is not processed until at the end of the period; and
the application server for cancelling all changes made while processing the one or more subsequent electronic messages,
wherein the input queue, the queue manager, the message ordering manager and the application server do not perform a sequential logic operation that indicates, within the first electronic message, a position of the first electronic message in the order sequence, and that indicates, within each of the one or more subsequent electronic messages, a position of said each of the one or more subsequent electronic messages in the order sequence.

12. The system according to claim 11, wherein the first message is tried again to be processed during the period of time.

13. The system according to claim 11, wherein the first message and the one or more subsequent electronic messages are tried to be processed in parallel.

14. A system for processing electronic messages, the method comprising:
an input queue for receiving a first electronic message and one or more subsequent electronic messages in an order sequence at an input queue;
a message ordering manager maintaining a list of the received electronic messages, the list including the order sequence in which the first electronic message and the one or more subsequent electronic messages arrive at the input queue;
a queue manager for providing the first electronic message and the one or more subsequent electronic messages from the input queue to an application server adapted for processing the first electronic message and the one or more subsequent electronic messages, the application server attempting processing of the first electronic message and the one or more subsequent electronic messages out-of-order;
the message ordering manager for checking whether the first electronic message has been processed and waiting for a pre-determined period of time for the first electronic message to be processed, if the first message is not processed;
the application server for determining whether the processing of the first electronic message is critical; and
the application server for committing the one or more subsequent electronic messages, if the processing of the first electronic message is not critical,
wherein the input queue, the queue manager, the message ordering manager and the application server do not perform a sequential logic operation that indicates, within the first electronic message, a position of the first electronic message in the order sequence, and that indicates, within each of the one or more subsequent electronic messages, a position of said each of the one or more subsequent electronic messages in the order sequence.

15. The system according to claim 14, wherein the first message and the one or more subsequent electronic messages are tried to be processed in parallel.

16. The system according to claim 14, wherein the criticality of the processing first message is based on a dependency between the first message and the one or more subsequent electronic messages.

17. The system according to claim 14, further comprising:
the application server for rolling back the one or more subsequent electronic messages, if the processing first message is critical and for cancelling all changes made while processing the one or more subsequent electronic messages.

18. The system according to claim 14, wherein the first message is tried again to be processed during the period of time.

19. A computer program product including programs of instructions in a non-transitory computer readable medium for processing electronic messages, wherein, when the programs of instructions are executed by at least one processor, the computer program product performs the steps of claim 6.

20. The method according to claim 1, wherein each electronic message has a different unique identifier.

* * * * *